(12) United States Patent
Kamata et al.

(10) Patent No.: US 8,418,448 B2
(45) Date of Patent: Apr. 16, 2013

(54) EXHAUST GAS TREATMENT DEVICE FOR CONSTRUCTION MACHINE

(75) Inventors: Hiroyuki Kamata, Tsuchiura (JP); Takahiro Kobayashi, Tsuchiura (JP); Toshihiro Abe, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 370 days.

(21) Appl. No.: 12/810,615

(22) PCT Filed: Mar. 19, 2009

(86) PCT No.: PCT/JP2009/055473
§ 371 (c)(1),
(2), (4) Date: Jun. 25, 2010

(87) PCT Pub. No.: WO2009/142058
PCT Pub. Date: Nov. 26, 2009

(65) Prior Publication Data
US 2010/0275588 A1 Nov. 4, 2010

(30) Foreign Application Priority Data
May 22, 2008 (JP) .................................. 2008-134456

(51) Int. Cl.
*F01N 13/00* (2010.01)

(52) U.S. Cl.
USPC .............................................. 60/322; 60/299

(58) Field of Classification Search .................... 60/297, 60/299, 301, 311, 322
See application file for complete search history.

(56) References Cited

U.S. PATENT DOCUMENTS

| 5,167,430 | A | * | 12/1992 | Bainbridge | 285/53 |
|---|---|---|---|---|---|
| 5,340,165 | A | * | 8/1994 | Sheppard | 285/226 |
| 5,680,757 | A | * | 10/1997 | Pirchl | 60/299 |
| 5,924,282 | A | * | 7/1999 | Thomas | 60/323 |
| 6,141,958 | A | * | 11/2000 | Voss | 60/272 |
| 6,260,652 | B1 | * | 7/2001 | Steenackers et al. | 180/296 |
| 7,628,238 | B2 | * | 12/2009 | Kobayashi et al. | 180/89.2 |
| 7,870,725 | B2 | * | 1/2011 | Hazelton | 60/322 |
| 2003/0162451 | A1 | * | 8/2003 | Ozawa | 440/89 H |
| 2010/0031644 | A1 | * | 2/2010 | Keane et al. | 60/295 |
| 2010/0038162 | A1 | * | 2/2010 | Kamiya et al. | 180/69.6 |

FOREIGN PATENT DOCUMENTS

| JP | 6-63818 U | 9/1994 |
|---|---|---|
| JP | 8-192642 A | 7/1996 |
| JP | 2002-70077 A | 3/2002 |
| JP | 2002-264667 A | 9/2002 |
| JP | 2003-104071 A | 4/2003 |
| JP | 2003-120277 A | 4/2003 |
| JP | 2004-293495 A | 10/2004 |
| JP | 2004-340114 A | 12/2004 |
| WO | WO 2009001587 A1 * | 12/2008 |

* cited by examiner

*Primary Examiner* — Thomas Denion
*Assistant Examiner* — Jorge Leon, Jr.
(74) *Attorney, Agent, or Firm* — Mattingly & Malur, PC

(57) ABSTRACT

An engine (8) is mounted to a vehicle body by means of vibration isolating mounts (8E), and a support member (15) is mounted to the engine (8). Vibration isolating members (20) are provided between this support member (15) and a mounting bracket (17) mounted to an exhaust gas treatment device (16). Accordingly, even in cases where the engine (8) has generated high-frequency vibrations, these vibrations can be damped by the vibration isolating mounts (8E) and the vibration isolating members (20). In consequence, treatment members constituting the exhaust gas treatment device (16), such as a catalyst, a filter, and a sensor, can be protected from the vibrations of the engine (8). In addition, as the exhaust gas treatment device (16) is provided with the mounting bracket (17), the vibration isolating members (20) can be reliably mounted to the exhaust gas treatment device (16) by means of the mounting bracket (17).

7 Claims, 10 Drawing Sheets

US 8,418,448 B2

EXHAUST GAS TREATMENT DEVICE FOR CONSTRUCTION MACHINE

TECHNICAL FIELD

The present invention relates to a construction machine such as a hydraulic excavator, and more particularly to a construction machine equipped with an exhaust gas treatment device for treating exhaust gas from an engine.

BACKGROUND ART

Generally, a hydraulic excavator as a typical example of construction machines is constituted by an automotive lower traveling structure, an upper revolving structure which is swingably mounted on the lower traveling structure, and a working mechanism liftably mounted on the front side of the upper revolving structure.

The upper revolving structure is largely constituted by a revolving frame forming a supporting structure, a cab which is provided on the front side of the revolving frame and where an operator gets on board, an engine mounted on the rear side of the revolving frame, a hydraulic pump mounted on one longitudinal side of the engine, and an exhaust gas treatment device connected to an exhaust manifold of the engine through an exhaust pipe.

As such exhaust gas treatment devices, exhaust gas purifying devices for removing harmful substances in exhaust gas, muffler devices for reducing the noise of the exhaust gas, and the like are known. In this case, the exhaust gas purifying devices include a particulate matter removing device for trapping and removing particulate matter (PM), a NOx purifying device for purifying nitrogen oxides (NOx), and the like, and these may be used in combination.

Here, a support member is mounted on the engine in such a manner as to protrude over the upper side of the hydraulic pump, and the exhaust gas treatment device is arranged to be mounted to the support member. At this time, as the exhaust gas treatment device is mounted to the engine through the support member, the exhaust gas treatment device constitutes the same vibration system as that of the engine, so that the exhaust gas treatment device can be fixedly mounted on the support member (see, for example, Patent Literatures 1 and 2).

Patent Literature 1: Japanese Patent Laid-Open No. 2003-120277 A
Patent Literature 2: Japanese Patent Laid-Open No. 2004-293495 A Incidentally, with the hydraulic excavator in accordance with the above-described Patent Literature 1, the exhaust gas treatment device is arranged to be fixed on the support member mounted on the engine. In this case, since the engine and the exhaust gas treatment device constitute the same vibration system, the exhaust gas treatment device can be fixedly mounted on the support member by using bolts and the like.

However, since high-frequency vibrations of the engine are directly transmitted to the exhaust gas treatment device, there is a problem in that exhaust gas treatment members and the like constituting the exhaust gas treatment device can be damaged by these vibrations.

DISCLOSURE OF THE INVENTION

In view of the above-described problems with the prior art, it is an object to provide a construction machine in which even if the exhaust gas treatment device is mounted on the engine side, the exhaust gas treatment device can be protected from the vibrations of the engine.

(1) A construction machine in accordance with the present invention comprises an automotive vehicle body, an engine mounted on the vehicle body, a hydraulic pump provided on one longitudinal side of the engine, a support member provided on the engine by being located on an upper side of the hydraulic pump, and an exhaust gas treatment device provided on the support member to purify exhaust gas from the engine.

Further, to overcome the above-described problems, a characteristic feature of the present invention lies in that a vibration isolating member is arranged to be provided between the support member and the exhaust gas treatment device to support the exhaust gas treatment device on the support member in a vibration isolated state.

By this construction, even in cases where the engine has generated high-frequency vibrations, these vibrations can be damped by the vibration isolating member, so that the exhaust gas treatment device can be protected from the vibrations of the engine. In particular, various devices for purifying exhaust gas are incorporated in the exhaust gas treatment device to make the surrounding environment satisfactory, and these devices can be protected from the vibrations of the engine. As a result, the devices constituting the exhaust gas treatment device can be prevented from becoming damaged by the vibrations of the engine, thereby making it possible to improve the durability and service life thereof.

(2) In this case, according to the present invention, the exhaust gas treatment device is constituted by a cylindrical case formed of a cylindrical body and having an inlet port and an outlet port for the exhaust gas, and a treatment member accommodated in the cylindrical case and adapted to purify or muffle the exhaust gas flowing thereinto. As a result, as for the exhaust gas treatment device, the treatment members can be protected by being accommodated in the cylindrical case.

(3) According to the present invention, the exhaust gas treatment device is arranged to be provided with a mounting bracket for mounting to the vibration isolating member, and the vibration isolating member is arranged to be provided between the support member and the mounting bracket. As a result, the vibration isolating member can be mounted to the exhaust gas treatment device by using the mounting bracket.

(4) According to the present invention, the mounting bracket is formed of a member separate from the cylindrical case for constituting the exhaust gas treatment device, and the mounting bracket is arranged to be integrally assembled to the cylindrical case by use of fastening members.

By this construction, as for the cylindrical case of the exhaust gas treatment device and the mounting bracket which are provided separately, the mounting bracket can be integrally assembled to the cylindrical case by use of the fastening members. Accordingly, the mounting bracket can be replaced by one which differs in shape, structure, and the like, so that it is possible to freely set the installing location, orientation, and the like of the exhaust gas treatment device. Thereby, the exhaust gas treatment device can be used in common for different construction machines.

(5) According to the present invention, the mounting bracket is constituted by a plate member for receiving and supporting the cylindrical case of the exhaust gas treatment device and U-bolt passage holes formed in the plate member, and wherein the fastening members are constituted by a U-bolt formed in a U-shape so as to straddle the cylindrical case and having screw portions formed at both end portions thereof and by nuts which are threadedly secured to the screw portions of the U-bolt, the exhaust gas treatment device being arranged to be fixed to the mounting bracket by inserting both end portions of the U-bolt into the U-bolt passage holes of the mounting bracket in such a manner as to straddle the cylindrical case of the exhaust gas treatment device, and in this state, by causing the nuts to be threadedly secured to the screw portions of the U-bolt.

As a result, the exhaust gas treatment device can be assembled in advance as a subassembly by being disposed on the plate member of the mounting bracket and by being fixed by means of the U-bolt and the nuts, namely, the fastening members. Further, the subassembly thus assembled in advance can be mounted simply to the support member on the engine side through the vibration isolating member.

(6) According to the present invention, the engine is mounted to the vehicle body by means of a vibration isolating mount, and the exhaust gas treatment device is arranged to be supported in a vibration isolated manner by two stages including the vibration isolating member and the vibration isolating mount. As a result, the vibrations transmitted from the engine to the exhaust gas treatment device can be damped by the two stages including the vibration isolating member and the vibration isolating mount, thereby making it possible to protect the exhaust gas treatment device from the vibrations of the engine.

(7) In this case, according to the present invention, the vibration isolating member is constituted by an elastic deformation portion formed of an elastic body and mounting screw portions provided on both sides by sandwiching the elastic deformation portion, and the vibration isolating member is arranged to be mounted between the support member and the mounting bracket by use of the mounting screw portions. As a result, the vibration isolating member is able to damp the vibrations transmitted from the engine to the exhaust gas treatment device by allowing its elastic deformation portion to be elastically deformed.

(8) According to the present invention, a flexible pipe for absorbing relative offset between the engine and the exhaust gas treatment device is arranged to be provided midway in an exhaust pipe connecting the engine and the exhaust gas treatment device. Thereby, the relative offset between the engine and the exhaust gas treatment device can be absorbed by the flexible pipe, thereby making it possible to improve the durability of such as the exhaust pipe, the engine, and the exhaust gas treatment device.

(9) According to the present invention, a heat shielding cover for blocking the transmission of heat from the engine to the vibration isolating member is provided in a periphery of the vibration isolating member. By this construction, when the engine is operated, the engine, the exhaust pipe, and the like undergo temperature rise, and the heat whose heat sources are constituted thereby tends to be transmitted to the vibration isolating member. However, the vibration isolating member can be protected by the heat shielding cover by blocking the heat from the engine, making it possible to prolong the service life of the vibration isolating member. As a result, the vibration isolating member is able to support the exhaust gas treatment device in the vibration isolated state and to extend periods of time.

(10) Further, according to the present invention, a stopper member for restraining the exhaust gas treatment device from becoming excessively displaced by the vibration isolating member is arranged to be provided between the support member and the heat shielding cover.

By this construction, the support member and the exhaust gas treatment device undergo relative displacement due to the vibration isolating member. In contrast, a stopper member for restraining the exhaust gas treatment device from becoming excessively displaced by the vibration isolating member is provided between the support member and the heat shielding cover. Therefore, the stopper member is able to restrain the exhaust gas treatment device from tending to undergo a large displacement in excess of an allowable range of the deformation of the vibration isolating member. It is possible to prevent such as causing damage to the vibration isolating member and interference of the exhaust gas treatment device with a surrounding member.

BRIEF DESCRIPTION OF THE DRAWINGS

FIG. 12 is an enlarged view of essential portions, taken from the left side in FIG. 11, of the exhaust gas treatment device, the support member, the vibration isolating members, and the like.

FIG. 13 is an enlarged view of essential portions illustrating the support member and the mounting bracket in accordance with a modification of the invention together with the exhaust gas treatment device, the vibration isolating members, and the like.

DESCRIPTION OF REFERENCE NUMERALS

Figure 1:
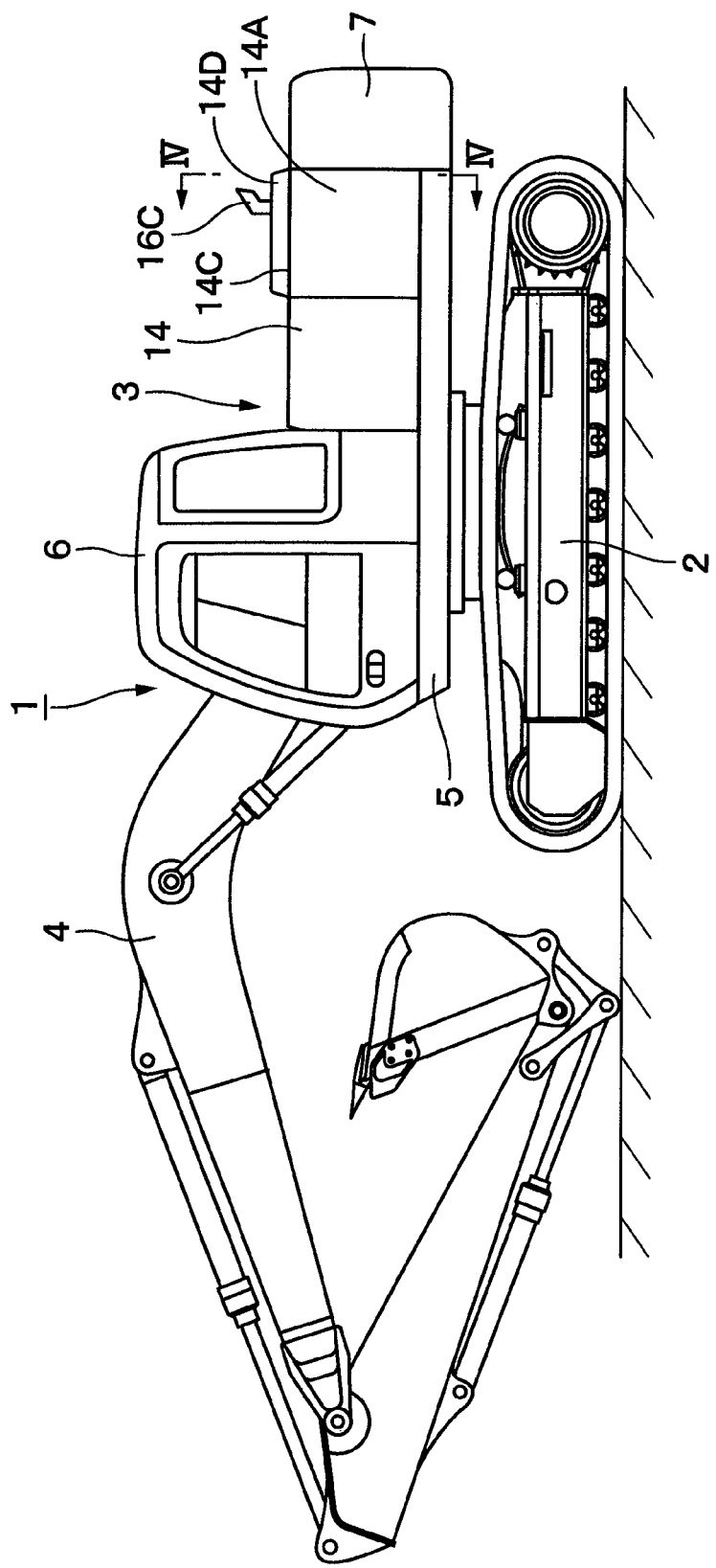
FIG. 1 is a front view illustrating a hydraulic excavator which is applied to a first embodiment of the invention.

1: Hydraulic excavator (construction machine)
2: Lower traveling structure (vehicle body)
3: Upper revolving structure (vehicle body)
4: Working mechanism
5: Revolving frame
8: Engine 8E: Vibration isolating mount
10: Hydraulic pump
15, 61: Support member
15A, 61A: Mounting face portion
15B, 61B: Supporting face portion
16, 41: Exhaust gas treatment device
16A: Cylindrical case
16B, 42B: Connecting pipe (inlet port)
16C, 43B: Tail pipe (outlet port)
17, 51, 52, 62: Mounting bracket
17A: Plate member
17B: U-bolt passage hole
17C: Vibration isolating member passage hole
18: U-bolt (fastening member)
18A: Screw portion
19: Nut (fastening member)
20: Vibration isolating member
20A: Elastic deformation portion
20B: Upper mounting screw portion
20C: Lower mounting screw portion
21: Exhaust pipe
22: Flexible pipe
31: Heat shielding cover
32: Stopper member
33: Fixed-side engaging portion
34: Movable-side engaging portion
42: Upstream cylinder (cylindrical case)
43: Downstream cylinder (cylindrical case)
44: Intermediate cylinder (cylindrical case)
45: Bolt (fastening member)
46: Oxidation catalyst (treatment member)
47: Particulate matter removing filter (treatment member)

BEST MODE FOR CARRYING OUT THE
INVENTION

Hereafter, with reference to the accompanying drawings, the present invention of the construction machine is described more particularly by way of its preferred embodiments which are applied by way of example to a hydraulic excavator.

FIGS. 1 to 9 show a first embodiment of the present invention. In FIG. 1, designated at 1 is a crawler type hydraulic excavator which is a typical example of construction machines, and this hydraulic excavator 1 is largely constituted by an automotive lower traveling structure 2, an upper revolving structure 3 which is swingably mounted on the lower traveling structure 2 and constitutes a vehicle body together with the lower traveling structure 2, and a working mechanism 4 liftably mounted on the front side of the upper revolving structure 3 to perform such as the operation of excavating earth and sand. The lower traveling structure 2 and the upper revolving structure 3 are specific examples of the vehicle body in accordance with the present invention.

Figure 2:
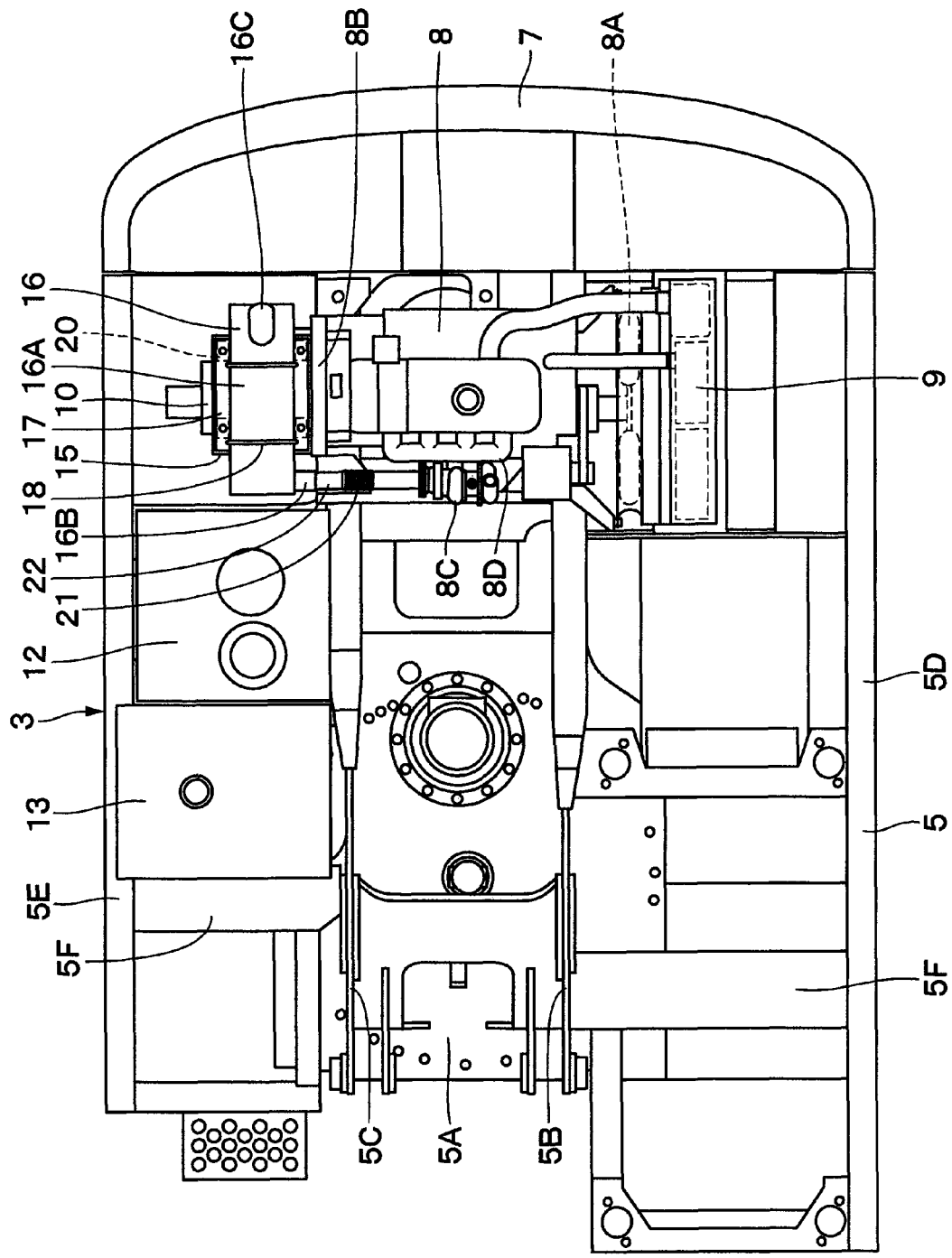
FIG. 2 is an enlarged plan view illustrating an upper revolving structure with a cab and the like omitted in FIG. 1.
Figure 3:
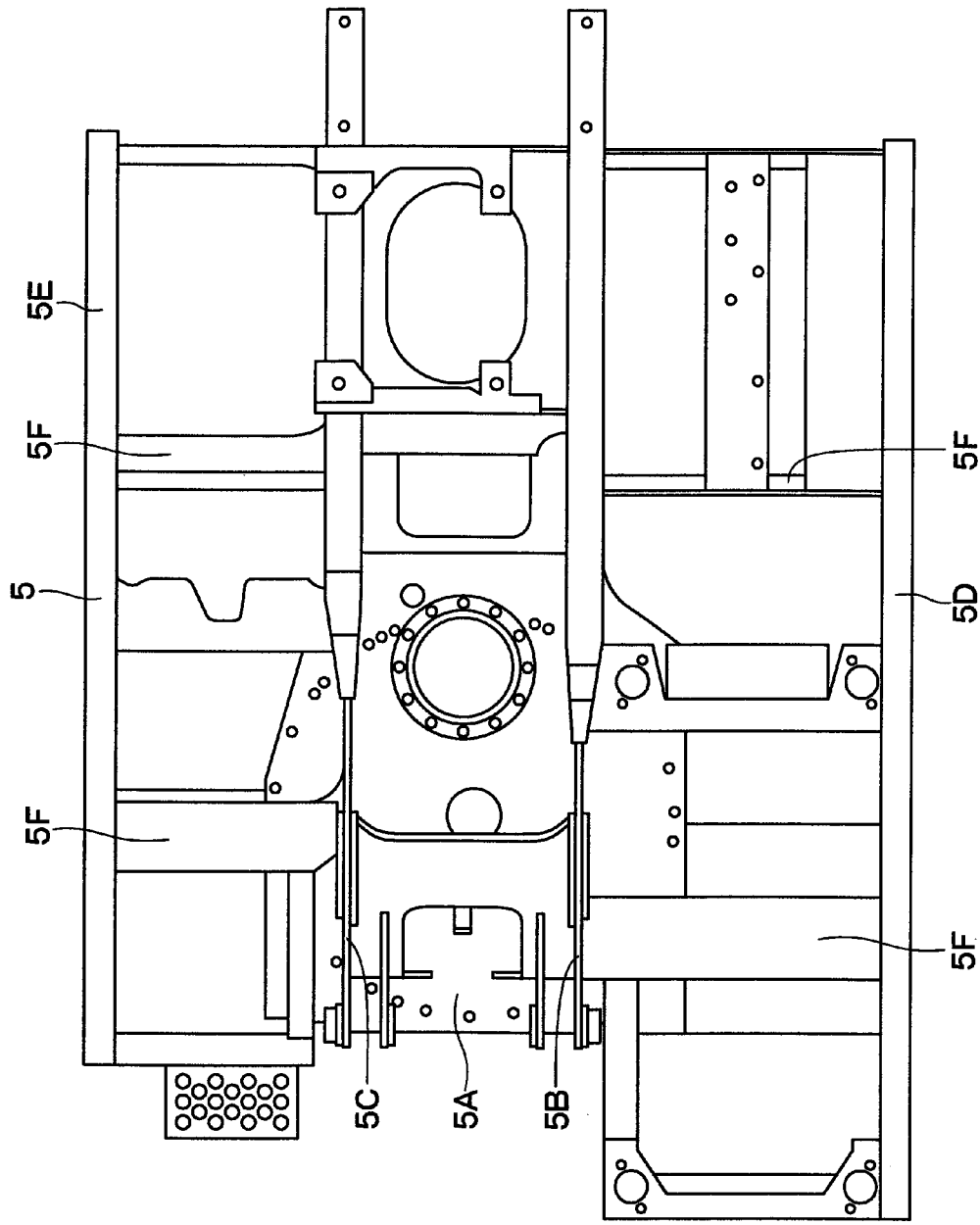
FIG. 3 is a plan view illustrating a revolving frame as a single unit in FIG. 2.

Here, the upper revolving structure 3 for constituting the hydraulic excavator 1 will be described in greater details. Indicated at 5 is a revolving frame of the upper revolving structure 3, and the revolving frame 5 is formed as a supporting structural body. Further, as shown in FIGS. 2 and 3, the revolving frame 5 is largely constituted by a bottom plate 5A formed of a thick-walled steel plate or the like extending in the front-rear direction; a left vertical plate 5B and a right vertical plate 5C erected on the bottom plate 5A and extending in the front-rear direction with a predetermined interval therebetween in the left-right direction; a left side frame 5D and a right side frame 5E each disposed at an interval with the respective one of the vertical plates 5B and 5C to the left or to the right and extending in the front-rear direction; and a plurality of extension beams 5F secured at their proximal ends to the bottom plate 5A and the respective one of the vertical plates 5B and 5C in such a manner as to extend in the left-right direction, and adapted to support the left and right side frames 5D and 5E at their distal end portions. Further, the working mechanism 4 is liftably mounted on the front side of the left and right vertical plates 5B and 5C by being located in the center in the left-right direction, and a below-described engine 8 and the like are provided on the rear side of the revolving frame 5.

Indicated at 6 is a cab (see FIG. 1) which is mounted on the left front side of the revolving frame 5 (left side of the foot portion of the working mechanism 4) and an operator rides in the cab 6. Disposed in its interior are an operator's seat in which the operator is seated, an operation lever for traveling, an operation lever for work operation, and the like (none are shown).

Indicated at 7 is a counterweight which is mounted on a rear end portion of the revolving frame 5. This counterweight 7 is for keeping a weight balance with the working mechanism 4 and projects such that its rear surface side is curved.

Figure 4:
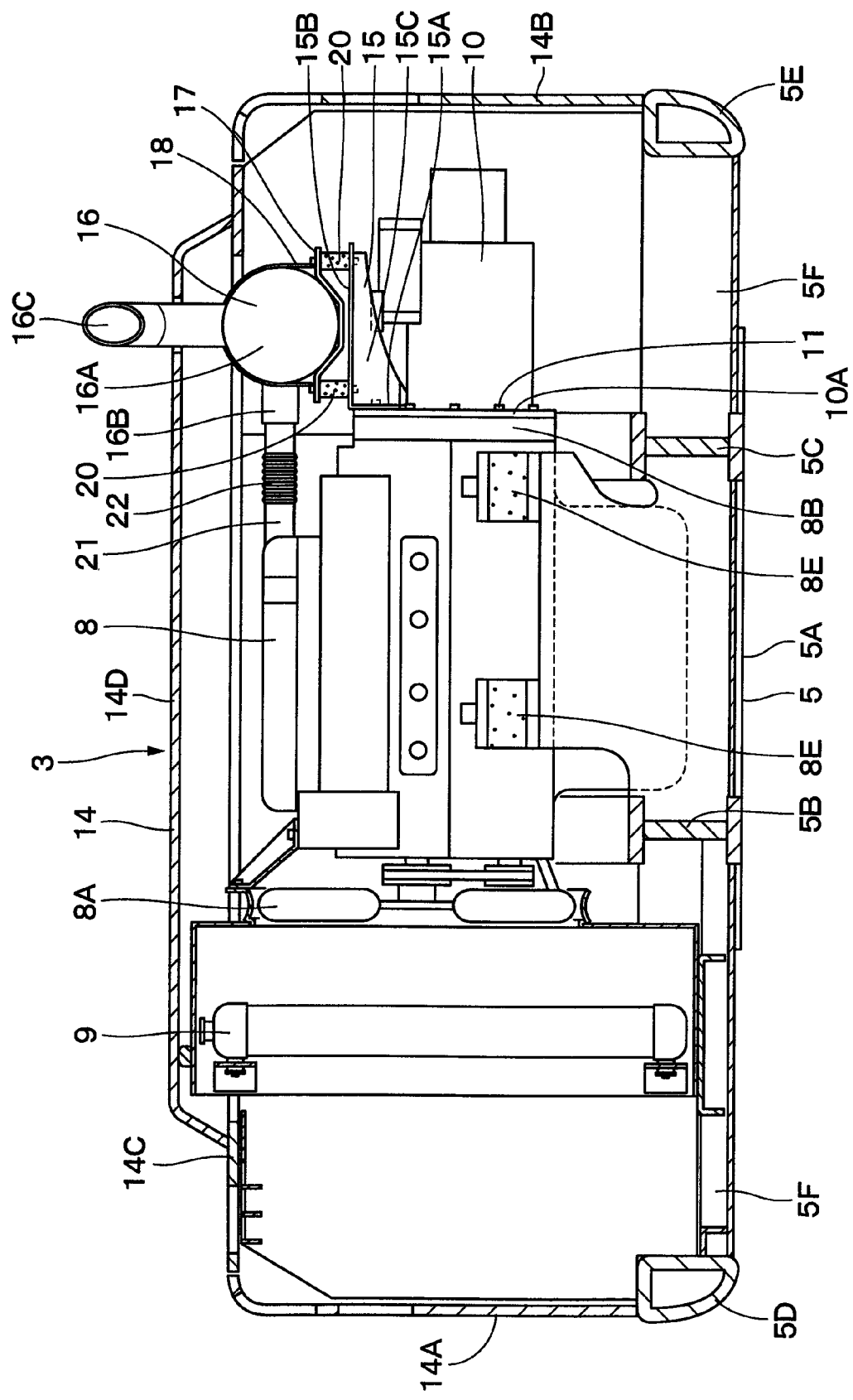
FIG. 4 is an enlarged cross-sectional view of the upper revolving structure, taken from the direction of arrows IV-IV in FIG. 1.
Figure 5:
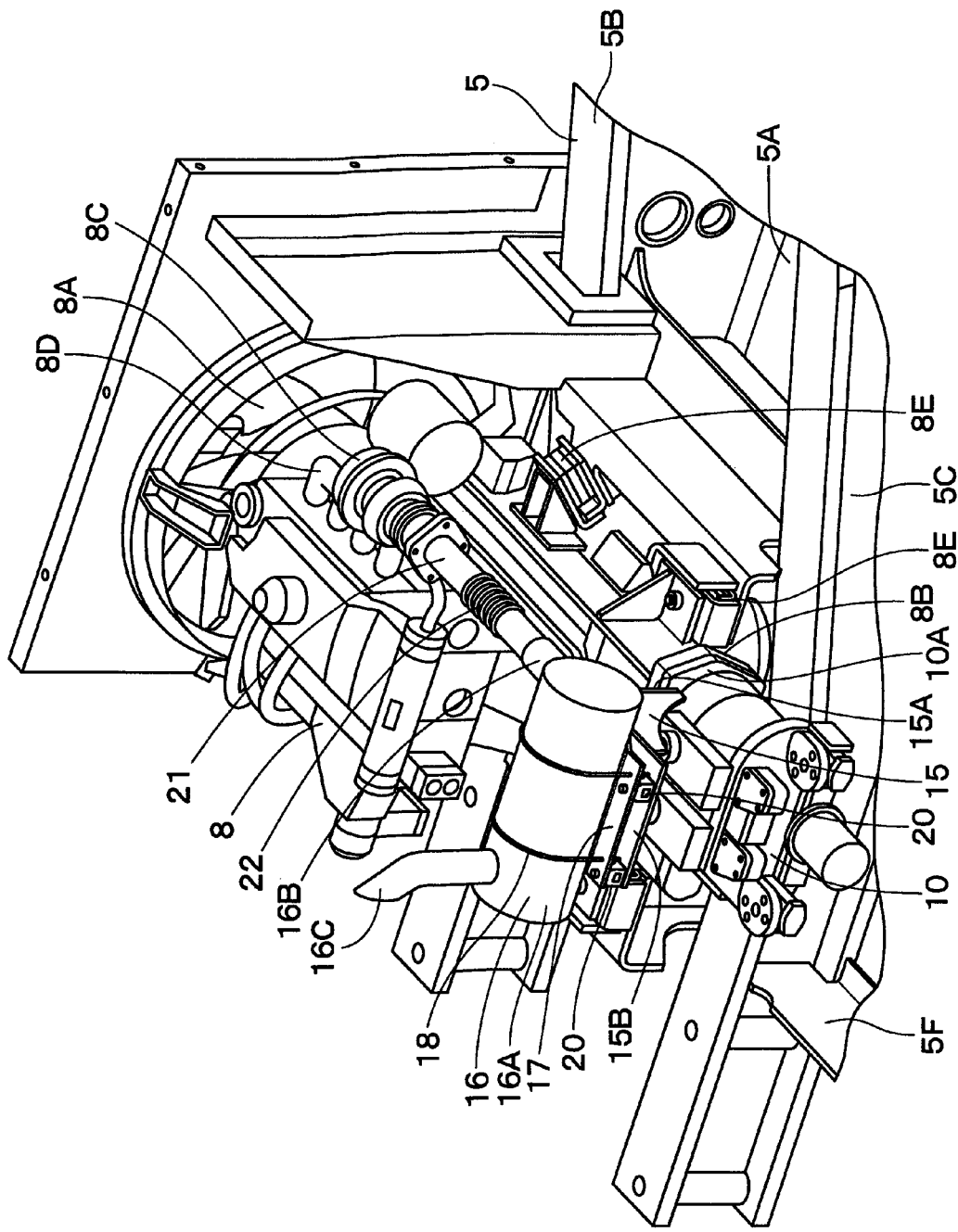
FIG. 5 is an enlarged perspective view of essential portions illustrating a support member, an exhaust gas treatment device, and the like in accordance with the first embodiment as mounted on an engine.

Indicated at 8 is an engine which is provided on the rear side of the revolving frame 5. The engine 8 is mounted in a transversely mounted state in which it extends in the left-right direction by being located on the front side of the counterweight 7. As shown in FIG. 4, a cooling fan 8A for supplying cooling air to below-described heat exchanger 9 is provided on the left side of the engine 8.

Meanwhile, the right side of the engine 8 is formed as a pump mounting portion 8B for mounting a below-described hydraulic pump 10. A supercharger 8C (see FIG. 2) called a turbocharger for increasing the flow rate of intake air which is sucked through an intake air filter (not shown) is provided on an upper portion of the front side of the engine 8. This supercharger 8C rotates by making use of the exhaust gas from the engine 8, and an exhaust manifold 8D and a below-described exhaust pipe 21 are connected to the supercharger 8C.

Further, the engine 8 is supported by the revolving frame 5 in a vibration isolated state by means of, for example, four vibration isolating mounts 8E (only two are shown in FIG. 4). As these vibration isolating mounts 8E support the engine 8 which is a heavy load, the vibration isolating mounts 8E are formed by use of elastic bodies having desired strength with respect to the weight.

Denoted at 9 is the heat exchanger disposed on the left side of the engine 8, and the heat exchanger 9 is provided in face-to-face relation to the cooling fan 8A. The heat exchanger 9 is constituted by such as a radiator for cooling engine cooling water, an oil cooler for cooling hydraulic oil, and an intercooler for cooling the air which is sucked for the engine 8.

Indicated at 10 is the hydraulic pump disposed on the right side of the engine 8, and the hydraulic pump 10 is driven by the engine 8 to thereby deliver operating oil supplied from a below-described operating oil tank 12 as pressurized oil. Further, a flange portion 10A is formed on the proximal end side of the hydraulic pump 10, and this flange portion 10A is mounted to the pump mounting portion 8B of the engine 8 by use of a plurality of bolts 11. Here, when the hydraulic pump 10 is mounted to the engine 8 by the bolts 11, a below-described support member 15 is mounted together with the hydraulic pump 10.

Indicated at 12 is the operating oil tank (see FIG. 2) which is mounted on the right side of the revolving frame 5 by being located on the front side of the hydraulic pump 10. This operating oil tank 12 stores operating oil for driving the lower traveling structure 2, the working mechanism 4, and the like.

Additionally, indicated at 13 is a fuel tank which is provided on the front side of the operating oil tank 12.

Indicated at 14 is a housing cover for covering from above the engine 8, the heat exchanger, an exhaust gas treatment device 16, and the like. The housing cover 14 is provided on the revolving frame 5 by being located between the cab 6 and the counterweight 7. As shown in FIG. 4, the housing cover 14 is largely constituted by a left side plate 14A and a right side plate 14B located at each of the left and right sides of the revolving frame 5 and extending in the front-rear direction and a top plate 14C extending horizontally between upper ends of the respective side plates 14A and 14B as to cover the engine 8 and the like. In addition, an engine cover 14D is openably provided on the top plate 14C so as to close an opening for maintenance.

Next, a description will be given of the construction for mounting the exhaust gas treatment device 16 to the right side of the engine 8.

Figure 6:
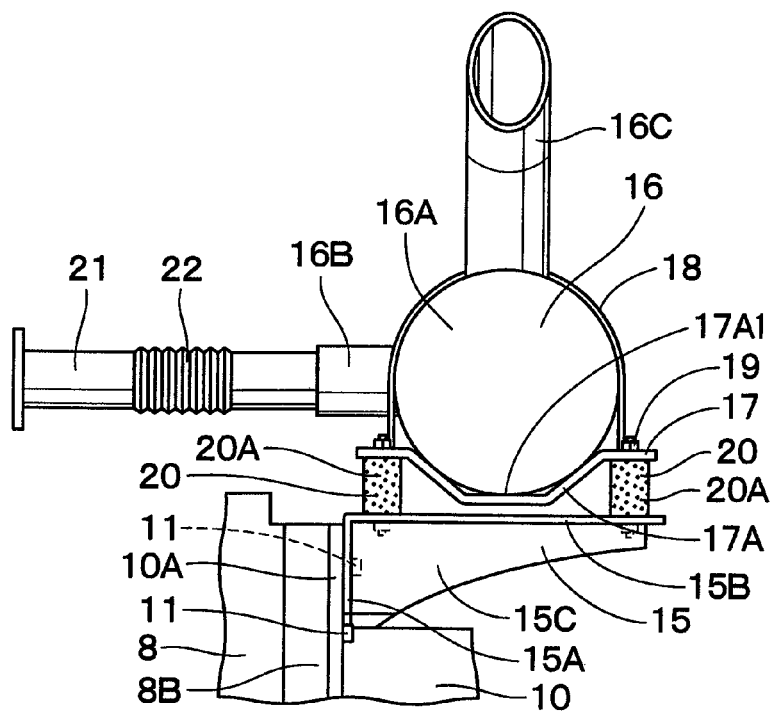
FIG. 6 is an enlarged view of essential portions illustrating the engine, the support member, the exhaust gas treatment device, vibration isolating members, an exhaust pipe, and the like in FIG. 4.
Figure 7:
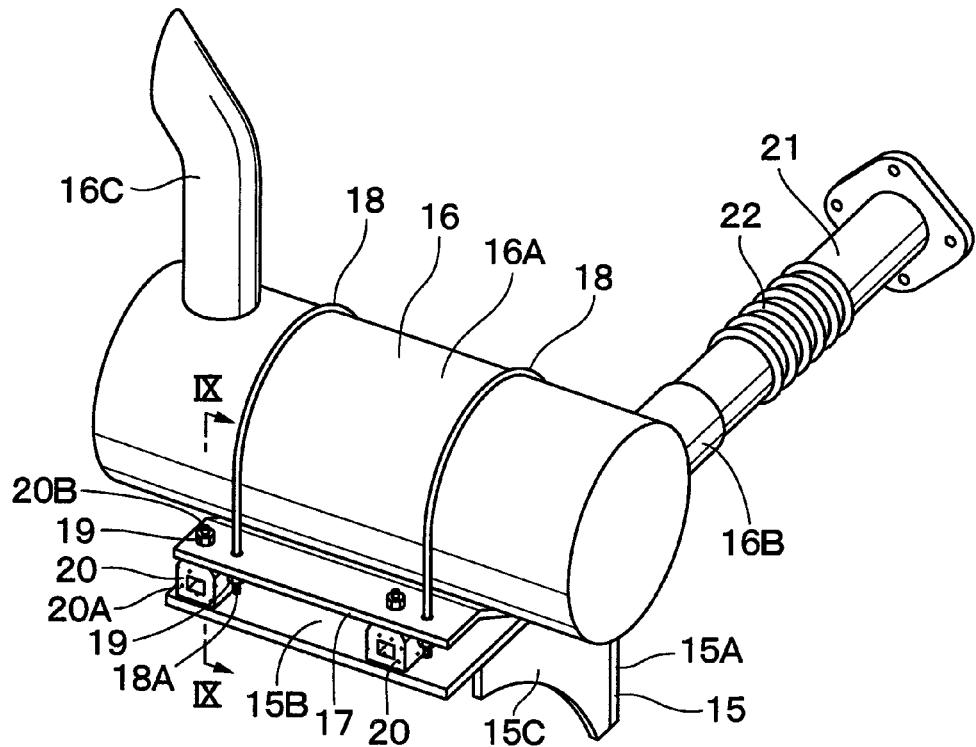
FIG. 7 is an external perspective view, taken from the right front side, of the support member, the exhaust gas treatment device, vibration isolating members, and the exhaust pipe.
Figure 8:
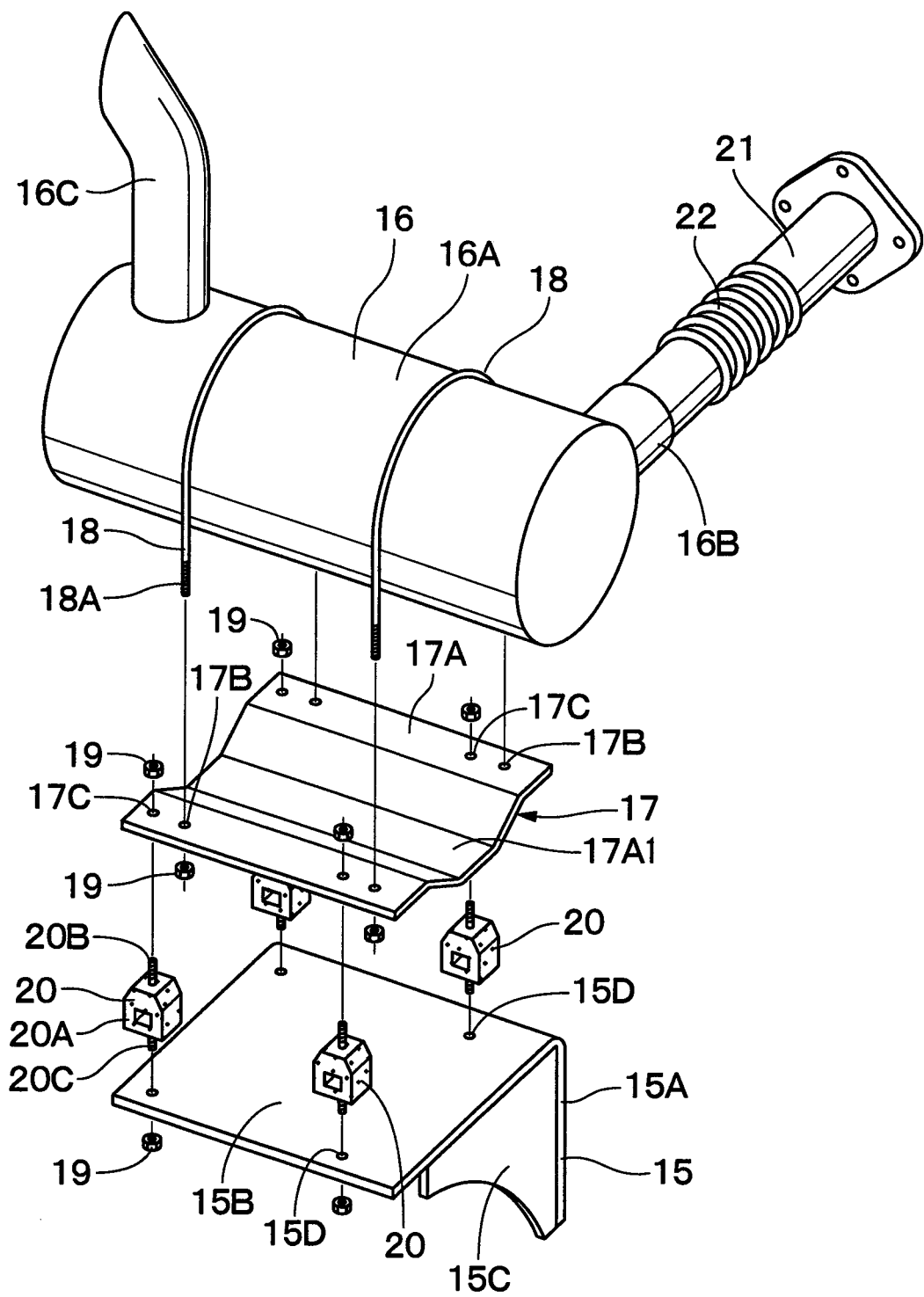
FIG. 8 is an exploded perspective view illustrating in a disassembled form the support member, the exhaust gas treatment device, and vibration isolating members.

Designated at 15 is a supporting base-like support member which is provided on the right side of the engine 8 by being located on the upper side of the hydraulic pump 10. The support member 15 is for supporting the below-described exhaust gas treatment device 16. As shown in FIGS. 6 to 8, the support member 15 is constituted by a mounting face portion 15A which is located on the proximal end side and is substantially vertical, a supporting face portion 15B extending substantially horizontally from the mounting face portion 15A toward the distal end side, and left and right side plate portions 15C for providing reinforcement between the mounting face portion 15A and the supporting face portion 15B. Further, a plurality of, for example, four, passage holes 15D (see FIGS. 8 and 9) for mounting below-described vibration isolating members 20 are bored in the supporting face portion 15B.

Further, the mounting face portion 15A of the support member 15 is butted against the flange portion 10A of the hydraulic pump 10, and in this state the support member 15 is mounted together with that flange portion 10A to the pump mounting portion 8B of the engine 8 by use of the bolts 11.

Designated at 16 is the exhaust gas treatment device which is provided on the support member 15 for treating the exhaust gas from the engine 8, and the exhaust gas treatment device 16 is mounted to the supporting face portion 15B of the support member 15 by means of the below-described vibration isolating members 20. This exhaust gas treatment device 16 treats the exhaust gas which is emitted from the engine 8.

In this case, the exhaust gas treatment device 16 is largely constituted by a cylindrical case 16A formed as a single circular pipe-shaped container extending in the front-rear direction and having both ends closed, a connecting pipe 16B serving as an inlet port and projecting from the front side (upstream side) of the cylindrical case 16A toward the engine 8 side, a tail pipe 16C serving as an outlet port and extending upward from the rear side (downstream side) of the cylindrical case 16A, and a treatment member (not shown) accommodated in the cylindrical case 16A to effect the purification treatment of the exhaust gas flowing in or muffle the exhaust gas.

Here, a description will be given of the treatment member which is accommodated in the cylindrical case 16A. The following are known as such treatment members, namely, a particulate matter removing filter for trapping and removing the particulate matter (PM) contained in the exhaust gas, an oxidation catalyst for converting nitrogen oxides (NOx) in the exhaust gas into nitrogen (NO2), a NOx purifying device for purifying nitrogen oxides (NOx) contained in the exhaust gas by use of an aqueous urea solution, a post-stage oxidation catalyst disposed in a stage following that NOx purifying device and adapted to convert nitrogen oxides (NOx) into ammonia (NH3) and water (H2O), a muffler (exhaust muffler) for reducing the noise of the exhaust gas, and the like. These treatment members can be used alone or in combination.

Denoted at 17 is a mounting bracket consisting of a member separate from the cylindrical case 16A so as to mount the exhaust gas treatment device 16 to the engine 8. The mounting bracket 17 is for mounting the exhaust gas treatment device 16 to the support member 15 through the vibration isolating members 20 by receiving and supporting the cylindrical case 16A of the exhaust gas treatment device 16. As shown in FIG. 8, the mounting bracket 17 is constituted by a rectangular plate member 17A having a groove-like recessed portion 17A1 in its center for receiving and supporting the cylindrical case 16A, U-bolt passage holes 17B which are formed at four corners of the plate member 17A in a state of sandwiching the recessed portion 17A1 and into which below-described U-bolts 18 are inserted, and vibration isolating member passage holes 17C which are formed at the four corners of the plate member 17A at positions different from those of the U-bolt passage holes 17B so as to mount the below-described vibration isolating members 20.

Indicated at 18 is the U-bolt constituting a fastening member in cooperation with the below-described nut 19. The U-bolt 18 is formed in a U-shape so as to straddle the cylindrical case 16A, and screw portions 18A are provided at both lower end portions thereof. Further, nuts 19 are threadedly secured to the screw portions 18A of the U-bolt 18 to fasten the cylindrical case 16A and the bracket 17.

Here, to fasten the exhaust gas treatment device 16 to the mounting bracket 17, the cylindrical case 16A is placed in the recessed portion 17A1 of the plate member 17A constituting the mounting bracket 17. The screw portions 18A of the two U-bolts 18 are then inserted into each of the U-bolt passage holes 17B so as to straddle the cylindrical case 16A from above, and the nuts 19 are threadedly secured to these screw portions 18A. As a result, the mounting bracket 17 can be integrally assembled to the cylindrical case 16A of the exhaust gas treatment device 16 by use of the U-bolts 18 and the nuts 19 which constitute the fastening members.

Thus, the exhaust gas treatment device 16 and the mounting bracket 17 can be integrally assembled in advance as a subassembly by use of the U-bolts 18 and the nuts 19. Then, the subassembly constituted in advance can be mounted to the supporting face portion 15B of the support member 15 in a vibration isolated state by attaching the below-described vibration isolating members 20 to the mounting bracket 17 and by fixing these vibration isolating members 20 to the supporting face portion 15B.

Figure 9:
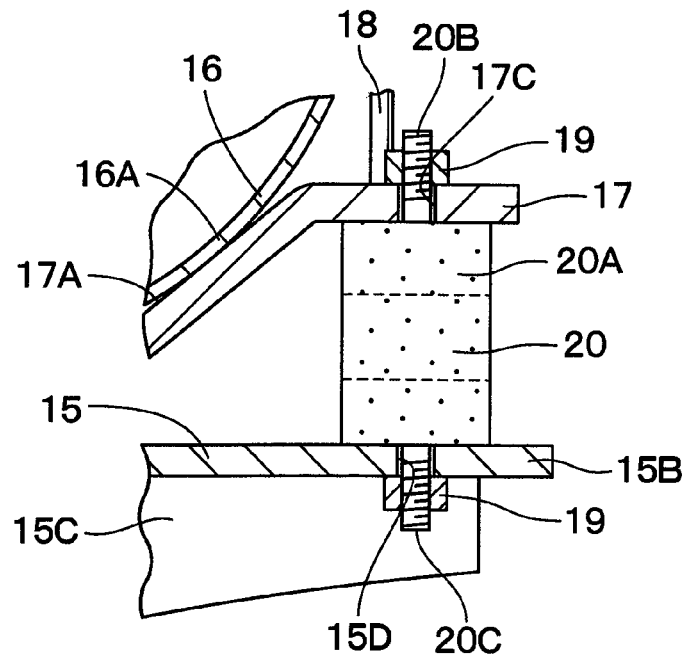
FIG. 9 is an enlarged cross-sectional view of the vibration isolating member, the support member, the mounting bracket, and the like, taken from the direction of arrows IX-IX in FIG. 7.

Denoted at 20 are the plurality of (e.g., four) vibration isolating members which are provided between the support member 15 and the mounting bracket 17 assembled to the exhaust gas treatment device 16. As shown in FIG. 9, these vibration isolating members 20 are each constituted by an elastic deformation portion 20A which is formed into a predetermined shape by use of an elastic body such as rubber and damps vibrations by undergoing deformation, an upper mounting screw portion 20B projecting upward from an upper portion of that elastic deformation portion 20A, and a lower mounting screw portion 20C projecting downward from a lower portion of the elastic deformation portion 20A.

The upper mounting screw portion 20B of each vibration isolating member 20 is inserted into the passage hole 17C of the mounting bracket 17 and is fixed by the nut 19. Meanwhile, the lower mounting screw portion 20C is inserted into the passage hole 15D formed in the supporting face portion 15B of the support member 15 and is fixed by the nut 19.

As the vibration isolating members 20 are provided between the exhaust gas treatment device 16 and the support member 15 provided on the engine 8, the vibration isolating members 20 are able to damp the vibrations of the upper revolving structure 3 during traveling and operation and the vibrations transmitted from the engine 8 to the exhaust gas treatment device 16 by allowing the elastic deformation portions 20A to be elastically deformed, thereby making it possible to protect devices such as the catalyst, the filter, and the sensor which are equipped in the exhaust gas treatment device 16 from the vibrations of the engine 8.

In this case, since the exhaust gas treatment device 16 is supported in the vibration isolated manner by two stages including the vibration isolating mounts 8E of the engine 8 and the vibration isolating members 20 supporting the exhaust gas treatment device 16, the hardness of the elastic deformation portions 20A for constituting the vibration isolating members 20 is set to such a hardness as to be able to effectively damp the vibrations transmitted from the engine 8.

Indicated at 21 is the exhaust pipe connecting the engine 8 and the exhaust gas treatment device 16. As shown in FIG. 2, the exhaust pipe 21 has one end connected to the supercharger 8C of the engine 8 and the other end connected to the connecting pipe 16B of the exhaust gas treatment device 16.

Further, indicated at 22 is a flexible pipe provided in the exhaust pipe 21. The flexible pipe 22 absorbs relative displacement (positional offset) between the supercharger 8C of the engine 8 and the exhaust gas treatment device 16, and is made of a flexible material and, for instance, is formed as a metallic cylinder of a bellows shape. Further, the flexible pipe 22 is integrally secured midway in the exhaust pipe 21 by using a welding means.

The hydraulic excavator 1 in accordance with the first embodiment has the above-described construction, and a description will be given next of the operation of this hydraulic excavator 1.

First, the operator gets into the cab 6 and is seated in the operator's seat. In this state, as the operator manipulates the operation lever for traveling, the lower traveling structure 2 can be driven to move the hydraulic excavator 1 forward or rearward. As the operator who is seated in the operator's seat manipulates the operation lever for work operation, it is possible to perform such as the operation of excavating earth and sand by lowering and raising the working mechanism 4.

Now, when this hydraulic excavator 1 is operated, the engine 8 produces vibrations on the revolving frame 5, but the engine 8 is supported by the revolving frame 5 through the vibration isolating mounts 8E. On the other hand, the vibration isolating members 20 are arranged to be provided between the mounting bracket 17 for mounting the exhaust gas treatment device 16 and the support member 15 on the engine 8 side. As a result, the vibrations transmitted from the engine 8 to the exhaust gas treatment device 16 can be damped by the two stages, thereby making it possible to protect the exhaust gas treatment device 16 from the vibrations of the engine 8.

According to the first embodiment, since the engine 8 is mounted to the revolving frame 5 through the vibration isolating mounts 8E, and the vibration isolating members 20 are provided between the support member 15 mounted on the engine 8 and the mounting bracket 17 supporting the exhaust gas treatment device 16, even in cases where the engine 8 has generated high-frequency vibrations, these vibrations can be damped by the vibration isolating mounts 8E and the vibration isolating members 20, thereby making it possible to protect the exhaust gas treatment device 16 from the vibrations of the engine 8.

In this case, various devices for giving consideration to environmental problems, i.e., treatment members including, for example, a particulate matter removing device constituted by an oxidation catalyst and a filter for trapping and removing the particulate matter (PM) contained in the exhaust gas and a NOx purifying device for purifying nitrogen oxides (NOx) contained in the exhaust gas by use of an aqueous urea solution, are incorporated in the cylindrical case 16A of the exhaust gas treatment device 16. These treatment members can be damaged by vibrations, but the vibration isolating members 20 are able to protect these treatment members from the vibrations.

As a result, the treatment members and various sensors constituting the exhaust gas treatment device 16 can be prevented from becoming damaged by the high-frequency vibrations of the engine 8, thereby making it possible to improve the durability and service life of the exhaust gas treatment device 16.

Further, since the mounting bracket 17 is provided for the exhaust gas treatment device 16, the use of the mounting bracket 17 makes it possible to reliably mount the vibration isolating members 20 to the exhaust gas treatment device 16.

In addition, the mounting bracket 17 is so arranged that the mounting bracket 17, after being provided separately from the cylindrical case 16A of the exhaust gas treatment device 16, is integrally assembled to the cylindrical case 16A by using the U-bolts 18 and the nuts 19 which are the fastening members. Accordingly, by providing a plurality of kinds of mounting brackets 17 which differ in shape, structure, and the like, it is possible to freely set the installing location, orientation, and the like of the exhaust gas treatment device 16. Thereby, one kind of exhaust gas treatment device 16 can be used in common for different hydraulic excavators 1.

Thus, the exhaust gas treatment device 16 and the mounting bracket 17 can be assembled in advance as a subassembly by being fixed by means of the U-bolts 18 and the nuts 19 constituting the fastening members. As a result, the subassembly can be mounted simply to the engine 8 through the vibration isolating members 20, making it possible to improve the operational efficiency in assembly.

Furthermore, since the flexible pipe 22 is provided midway in the exhaust pipe 21 of the engine 8, relative positional offset (vibration) between the engine 8 and the exhaust gas treatment device 16 can be absorbed by the deformation of the flexible pipe 22, making it possible to improve the durability of such as the exhaust pipe 21, the engine 8, and the exhaust gas treatment device 16.

Figure 10:
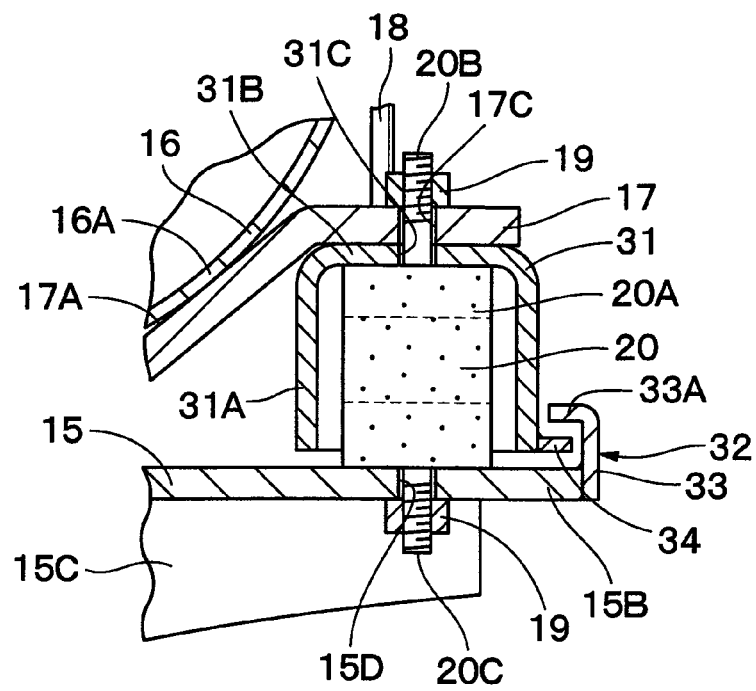
FIG. 10 is an enlarged cross-sectional view, taken from a position similar to that of FIG. 9, of the vibration isolating member, the support member, the mounting bracket, a heat shielding cover, a stopper member, and the like in accordance with a second embodiment of the invention.

Next, FIG. 10 shows a second embodiment in accordance with the present invention. The characteristic feature of this embodiment lies in a construction in which a heat shielding cover for preventing heat from being transmitted from the engine to the vibration isolating member is provided around each vibration isolating member, and a stopper member for restraining the exhaust gas treatment device from becoming excessively displaced by the vibration isolating members is provided between the support member and each heat shielding cover. In the second embodiment, the component elements that are identical to those of the foregoing first embodiment will be simply indicated by the same reference numerals to avoid repetitions of similar explanations.

In FIG. 10, designated at 31 is a heat shielding cover in accordance with the second embodiment which is provided in such a manner as to cover the vibration isolating member 20. This heat shielding cover 31 is formed in the shape of a lidded cylinder by a cylinder portion 31A covering the periphery of the elastic deformation portion 20A of the vibration isolating member 20 and a lid portion 31B covering the upper side of the elastic deformation portion 20A. A passage hole 31C, into which the upper mounting screw portion 20B of the vibration isolating member 20 is inserted, is bored in the center of the lid portion 31B.

As a result, as the heat shielding cover 31 is fitted over the vibration isolating member 20 from above while the upper mounting screw portion 20B is inserted into the passage hole 31C, the heat shielding cover 31 is able to cover the elastic deformation portion 20A formed of a rubber material or the like. As a result, the heat shielding cover 31 is able to shield the heat generated by the engine 8 and the exhaust pipe 21, which assume high temperatures, constitute heat sources, thereby making it possible to cover the elastic deformation portion 20A.

As for the heat shielding cover 31, the lengthwise dimension (axial dimension) of its cylinder portion 31A is set to be shorter than that of the elastic deformation portion 20A. As a result, when the elastic deformation portion 20A is elastically deformed to the contracting side, the heat shielding cover 31 is able to prevent the cylinder portion 31A from interfering with the supporting face portion 15B of the support member 15.

Next, a description will be given of a stopper member 32 for restraining the amount of displacement of the exhaust gas treatment device 16 due to the vibration isolating member 20.

Namely, designated at 32 is the stopper member which is provided between the support member 15 and the heat shielding cover 31. This stopper member 32 is for restraining to within a predetermined range the displacement of the exhaust gas treatment device 16 based on such as the vibration of the upper revolving structure 3 (vehicle body) and the vibration of the engine 8 during traveling and operation to thereby prevent the elastic deformation portion 20A of the vibration isolating member 20 from becoming excessively deformed. The stopper member 32 is constituted by a fixed-side engaging portion 33 which is attached to the support member 15 and a movable-side engaging portion 34 which is attached to the heat shielding cover 31 and is engageable with that fixed-side engaging portion 33.

In this case, the fixed-side engaging portion 33 is secured to the supporting face portion 15B of the support member 15 by being located in the vicinity of the heat shielding cover 31 (vibration isolating member 20). An upper portion of the fixed-side engaging portion 33 is formed as an engaging pawl 33A which is bent toward the heat shielding cover 31 side. Further, an interval between the engaging pawl 33A and the upper surface of the supporting face portion 15B is set to such a dimension as to be able to secure a clearance with the movable-side engaging portion 34 when the elastic deformation portion 20A of the vibration isolating member 20 is deformed within a proper range.

Meanwhile, the movable-side engaging portion 34 is secured to an outer periphery of the cylinder portion 31A of the heat shielding cover 31. More specifically, the movable-side engaging portion 34 is secured to a lower position on an outer peripheral surface of the cylinder portion 31A, and is formed as a tongue-like plate projecting to the radially outward side so as to engage with the engaging pawl 33A of the fixed-side engaging portion 33. In this case, as the movable-side engaging portion 34 is arranged in a substantially intermediate portion between the engaging pawl 33A of the fixed-side engaging portion 33 and the upper surface of the supporting face portion 15B, the movable-side engaging portion 34 is able to equally allow the contracting side displacement and the extending side displacement of the elastic deformation portion 20A.

Further, when the exhaust gas treatment device 16 undergoes a large vibration (excessive displacement) in the extending direction (springing-up direction) on the support member 15, the movable-side engaging portion 34 of the stopper member 32 abuts against the engaging pawl 33A of the fixed-side engaging portion 33. On the other hand, when the exhaust gas treatment device 16 undergoes a large vibration in the contracting direction (sinking direction) on the support member 15, the movable-side engaging portion 34 abuts against the supporting face portion 15B of the support member 15. As a result, the displacement of the exhaust gas treatment device 16 can be restrained within the allowable range of deformation of the vibration isolating member 20.

As such, also with the second embodiment thus constructed, it is possible to obtain operational effects substantially similar to those of the above-described first embodiment. Particularly in the second embodiment, since the construction provided is such that the periphery of the elastic deformation portion 20A of the vibration isolating member 20 is covered by the heat shielding cover 31, it is possible to prevent the heat generated from such as the engine 8 and the exhaust pipe 21 from acting on the elastic deformation portions 20A formed of the rubber material. As a result, the service lives of the elastic deformation portions 20A can be prolonged, and the exhaust gas treatment device 16 can be supported in a vibration isolated state over extended periods of time.

Further, the stopper member 32 for restraining the exhaust gas treatment device 16 from becoming excessively displaced due to the vibration isolating member 20 is arranged to be provided between the support member 15 and the heat shielding cover 31. Therefore, when the exhaust gas treatment device 16 has tended to undergo a large displacement in excess of the allowable range of deformation of the elastic deformation portion 20A of the vibration isolating member 20, the stopper member 32 causes the movable-side engaging portion 34 to abut against the fixed-side engaging portion 33 or the supporting face portion 15B of the support member 15, and is thereby able to restrain the excessive deformation of the elastic deformation portion 20A. As a result, it is possible to prevent the vibration isolating member 20 from becoming damaged by the excessive deformation and the exhaust gas treatment device 16 from interfering with a surrounding member.

Figure 11:
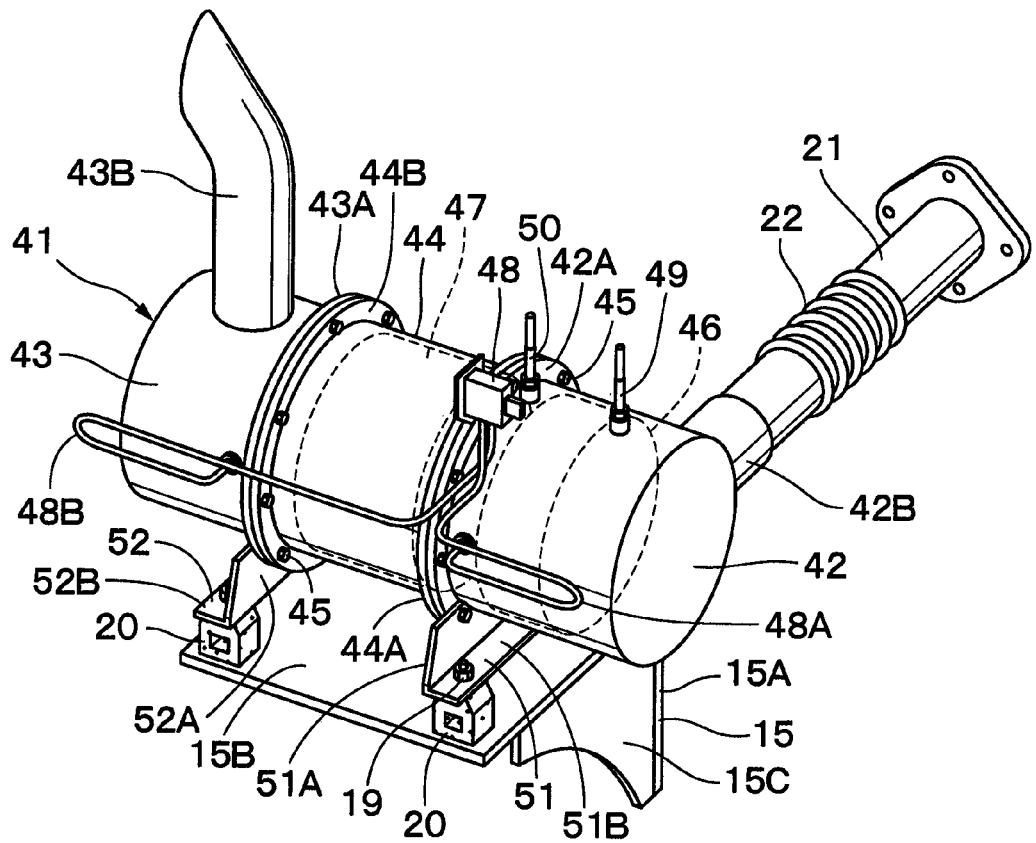
FIG. 11 is an external perspective view of the exhaust gas treatment device, the vibration isolating members, the exhaust pipe, and the like in accordance with a third embodiment of the invention.
Figure 12:
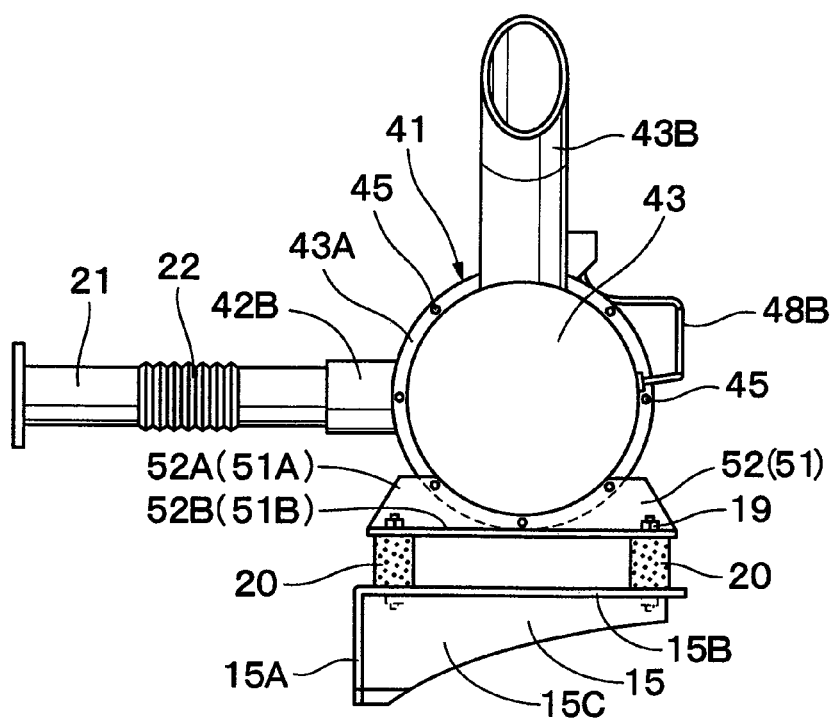

Next, FIGS. 11 and 12 show a third embodiment in accordance with the present invention. The characteristic feature of this embodiment lies in that the cylindrical case of the exhaust gas treatment device is divided into three parts in the longitudinal direction, and devices for trapping and removing the particulate matter contained in the exhaust are provided therein. In the third embodiment, the component elements that are identical to those of the foregoing first embodiment will be simply indicated by the same reference numerals to avoid repetitions of similar explanations.

In FIGS. 11 and 12, designated at 41 is an exhaust gas treatment device in accordance with the third embodiment which is provided on the support member 15. This exhaust gas treatment device 41 is mounted on the supporting face portion 15B of the support member 15 by means of below-described mounting brackets 51 and 52 and the vibration isolating members 20. The exhaust gas treatment device 41 is largely constituted by an upstream cylinder 42, a downstream cylinder 43, an intermediate cylinder 44, an oxidation catalyst 46, and a particulate matter removing filter 47, and the like, which will be described hereinunder.

Namely, the exhaust gas treatment device 41 in accordance with the third embodiment is so constructed that three cylinders, namely, the upstream cylinder 42 located on the front side, the downstream cylinder 43 located on the rear side, and the intermediate cylinder 44 located therebetween, are flange-connected by use of bolts 45.

The upstream cylinder 42 is formed in the shape of a lidded cylinder with its front side closed, and a flange portion 42A with an enlarged diameter is provided at an opening portion on the rear side. A connecting pipe 42B projecting toward the engine 8 side and serving as an inlet port is provided at a position close to the front side of the upstream cylinder 42. Further, the below-described oxidation catalyst 46 and the like are provided in the upstream cylinder 42.

The downstream cylinder 43 is formed in the shape of a lidded cylinder with its rear side closed, and a flange portion 43A with an enlarged diameter is provided at an opening portion on the front side. A tail pipe 43B projecting upward and serving as an outlet port is provided at a position close to the rear side of the downstream cylinder 43.

The intermediate cylinder 44 is formed in a cylindrical shape with both of its ends open, a flange portion 44A is provided at an opening portion on the front side, and a flange portion 44B is provided at an opening portion on the rear side. Further, the particulate matter removing filter 47 is accommodated in the intermediate cylinder 44.

In this case, the upstream cylinder 42 and the intermediate cylinder 44 are integrally connected by use of the bolts 45 serving as fastening members in a state in which the flange portion 42A of the upstream cylinder 42 and the flange portion 44A of the intermediate cylinder 44 are opposed to each other. The downstream cylinder 43 and the intermediate cylinder 44 are integrally connected by use of the bolts 45 and the like in a state in which the flange portion 43A of the downstream cylinder 43 and the flange portion 44B of the intermediate cylinder 44 are opposed to each other. Therefore, the three cylinders 42, 43, and 44 can be formed into one cylindrical case by flange connection, and only the intermediate cylinder 44 can be removed by detaching the bolts 45.

Next, a description will be given of the treatment members which are provided to purify the exhaust gas by removing the particulate matter (PM) in the exhaust gas.

Indicated at 46 is the oxidation catalyst which constitutes one treatment member accommodated in the upstream cylinder 42. The oxidation catalyst 46 is formed by coating with a precious metal (catalyst) a cellular cylindrical body in which a porous member constituted of, for example, a ceramic material is provided with a multiplicity of pores in the axial direction. Further, as the exhaust gas are passed through the oxidation catalyst 46 at a predetermined temperature, the oxidation catalyst 46 oxidizes and removes the harmful matter contained in the exhaust gas.

Indicated at 47 is the particulate matter removing filter (generally called a diesel particulate filter, this filter 47 being hereinafter referred to as the "DPF 47") which constitutes a treatment member accommodated in the intermediate cylinder 44. This DPF 47 traps the particulate matter (PM) in the exhaust gas emitted from the engine 8 and removes it by burning, to thereby purify the exhaust gas. The DPF 47 is formed as a cellular cylindrical body in which a porous member constituted of, for example, a ceramic material is provided with a multiplicity of pores in the axial direction.

Denoted at 48 is a pressure sensor which is provided on the outer peripheral side of the upstream cylinder 42. The pressure sensor 48 is for detecting pressures of (pressure difference between) the upstream side and the downstream side of the DPF 47 so as to estimate the amount of deposits of the particulate matter, unburnt residues, and the like in the DPF 47. Then, the pressure sensor 48 has its upstream side pipe 48A connected to the upstream cylinder 42 and its downstream side pipe 48B connected to the downstream cylinder 43.

Denoted at 49 is an upstream side temperature sensor which is provided on the upstream side of the upstream cylinder 42. This upstream side temperature sensor 49 is for confirming whether or not the temperature of the exhaust gas flowing in is a temperature at which the oxidation catalyst 46 is capable of functioning, and the upstream side temperature sensor 49 is connected to a controller (not shown).

Denoted at 50 is a downstream side temperature sensor which is provided on the downstream side of the upstream cylinder 42. This downstream side temperature sensor 50 is for detecting the temperature of the exhaust gas which passed through the oxidation catalyst 46 to confirm whether or not the regeneration by the DPF 47 is possible.

Denoted at 51 and 52 are the mounting brackets which are used in the third embodiment. Unlike the mounting bracket 17 used in the first embodiment, the mounting brackets 51 and 52 are formed by use of L-shaped plates. Namely, the two mounting brackets 51 and 52 are each formed by a plate which is bent in an angle shape (a substantially L-shape), and have vertical face portions 51A and 52A and horizontal face portions 51B and 52B, respectively.

In this case, the vertical face portion 51A of the mounting bracket 51 on the upstream side is fastened to both the flange portion 42A of the upstream cylinder 42 and the flange portion 44A of the intermediate cylinder 44 by use of the bolts 45. The vertical face portion 52A of the mounting bracket 52 on the downstream side is fastened to both the flange portion 44B of the intermediate cylinder 44 and the flange portion 43A of the downstream cylinder 43 by use of the bolts 45. Meanwhile, the vibration isolating members 20 are mounted between the support member 15 and each of the horizontal face portions 51B and 52B of the mounting brackets 51 and 52 by use of the nuts 19.

As such, also with the third embodiment thus constructed, it is possible to obtain operational effects substantially similar to those of the above-described first embodiment. Particularly in the third embodiment, the oxidation catalyst 46 and the DPF 47, which are formed of ceramic materials or the like, and the pressure sensor 48 and the temperature sensors 49 and 50, which are precision instruments, can be protected from the vibrations of the engine 8 by the vibration isolating members 20, thereby making it possible to improve their durability and service lives.

In addition, since the mounting brackets 51 and 52 are formed by use of L-shaped plates, the mounting brackets 51 and 52 can be formed into simple shapes in comparison with the mounting bracket 17 used in the first embodiment.

Figure 13:
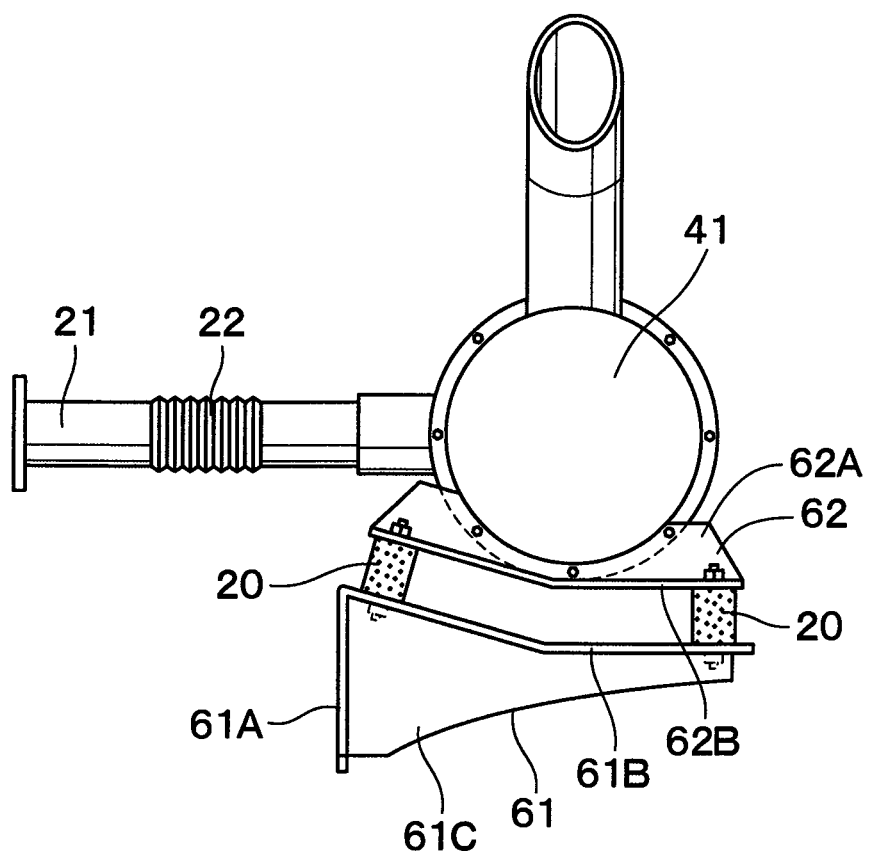

It should be noted that, in the third embodiment, a description has been given by citing as an example the case in which the construction provided is such that the supporting face portion 15B, which is substantially horizontal and flat, is provided in the support member 15, and the mounting brackets 51 and 52 and the exhaust gas treatment device 41 are mounted on this supporting face portion 15B by means of the vibration isolating members 20. However, the present invention is not limited to the same, and may be constructed as in a modification shown in FIG. 13, for example.

Namely, a support member 61 is formed by a vertical mounting face portion 61A, a supporting face portion 61B inclined in a V-shape, and a side plate portion 61C for reinforcement. Meanwhile, a mounting bracket 62 is similarly formed by a vertical face portion 62A inclined in a V-shape and a horizontal face portion 62B. Further, a construction may be adopted in which the vibration isolating members 20 are each mounted between the inclined supporting face portion 61B and the horizontal face portion 62B to support the exhaust gas treatment device 41. In this construction, the exhaust gas treatment device 41 can be mounted to the supporting face portion 61B in a vibration isolated state by bending the horizontal face portion 62B of the mounting bracket 62 in conformity with the supporting face portion 61B of the support member 61. This construction may be similarly applied to the other embodiments as well.

Further, according to the third embodiment, as the exhaust gas treatment device 41, a description has been given by citing as an example the case in which the construction provided is such that there is provided a particulate matter removing device consisting of such as the oxidation catalyst 46, the DPF 47, the pressure sensor 48, and the temperature sensors 49 and 50 for purifying the exhaust gas by removing the particulate matter (PM) contained in the exhaust gas. However, the present invention is not limited to the same, and, for example, a NOx purifying device consisting of such as a selective reduction catalyst, a urea injection valve, and various sensors for purifying nitrogen oxides (NOx) contained in the exhaust gas by using an aqueous urea solution may be used as the exhaust gas treatment device 41. In addition, the exhaust gas treatment device may be so configured as to use the particulate matter removing device and the NOx purifying device in combination. This configuration may be similarly applied to the other embodiments as well.

Furthermore, in the embodiments, as the construction machine, a description has been given by citing as an example the hydraulic excavator 1 having the crawler type lower traveling structure 2. However, the present invention is not limited to the same, and may be applied to, for example, a hydraulic excavator having a wheel type lower traveling structure. In addition, the present invention is widely applicable to other construction machines such as a wheel loader, a dump truck, and the like.

The invention claimed is:

1. A construction machine comprising:
   an automotive vehicle body, an engine mounted on said vehicle body, a hydraulic pump provided on one longitudinal side of said engine, a support member provided on said engine located on an upper side of said hydraulic pump, and an exhaust gas treatment device provided on said support member to purify exhaust gas from said engine, wherein:
   said exhaust gas treatment device comprises a cylindrical case formed of a cylindrical body and having an inlet port and an outlet port for the exhaust gas, and a treatment member accommodated in said cylindrical case and adapted to purify or muffle the exhaust gas flowing thereinto,
   said cylindrical case of said exhaust gas treatment device is provided with a mounting bracket formed of a member separate from said cylindrical case,
   a vibration isolating member is provided between said support member and said mounting bracket to support said exhaust gas treatment device on said support member in a vibration isolated state, and
   a heat shielding cover for blocking the transmission of heat from said engine to said vibration isolating member is provided in a periphery of said vibration isolating member and formed in a cylindrical shape having an open end, a closed end and, a cylindrical portion, wherein the closed end covers an upper side of said vibration isolating member and the cylinder portion covers the periphery of said vibration isolating member and has a lengthwise dimension set to be shorter than that of the lengthwise dimension of said vibration isolating member.

2. A construction machine according to claim 1, wherein said mounting bracket is integrally assembled to said cylindrical case by use of fastening members.

3. A construction machine according to claim 2, wherein:
   said mounting bracket comprises a plate member for receiving and supporting said cylindrical case of said exhaust gas treatment device and U-bolt passage holes formed in said plate member, and
   said fastening members comprise a U-bolt formed in a U-shape so as to straddle said cylindrical case and having screw portions formed at both end portions thereof and by nuts which are threadedly secured to said screw portions of said U-bolt, and
   said exhaust gas treatment device is fixed to said mounting bracket by inserting the both end portions of said U-bolt into said U-bolt passage holes of said mounting bracket in such a manner as to straddle said cylindrical case of said exhaust gas treatment device, and in this state, by causing said nuts to be threadedly secured to said screw portions of said U-bolt.

4. A construction machine according to claim 1, wherein said engine is mounted to said vehicle body by means of a vibration isolating mount, and said exhaust gas treatment device is supported in a vibration isolated manner by two stages including said vibration isolating member and said vibration isolating mount.

5. A construction machine according to claim 1, wherein said vibration isolating member comprises an elastic deformation portion formed of an elastic body and mounting screw portions provided on both sides thereof by sandwiching said elastic deformation portion, and said vibration isolating member is mounted between said support member and said mounting bracket by use of said mounting screw portions.

6. A construction machine according to claim 1, wherein a flexible pipe for absorbing relative offset between said engine and said exhaust gas treatment device is provided midway in an exhaust pipe connecting said engine and said exhaust gas treatment device.

7. A construction machine according to claim 1, wherein a stopper member for restraining said exhaust gas treatment device from becoming excessively displaced by said vibration isolating member is provided between said support member and said heat shielding cover.

* * * * *